United States Patent [19]
Lynn et al.

[11] Patent Number: 5,623,369
[45] Date of Patent: Apr. 22, 1997

[54] OPTICAL SPLITTER

[75] Inventors: Mark A. Lynn; Kurt L. Jennings, both of Warren, Ohio; Ernest E. Helms, Farmington Hills, Mich.

[73] Assignee: General Motors Corporation, Detroit, Mich.

[21] Appl. No.: 617,312

[22] Filed: Mar. 18, 1996

[51] Int. Cl.$^6$ .................................................. G02B 27/12
[52] U.S. Cl. .............................................. 359/639; 385/46
[58] Field of Search .............................. 359/639; 385/46

[56] References Cited

U.S. PATENT DOCUMENTS

| | | | |
|---|---|---|---|
| 4,995,692 | 2/1991 | Diliello et al. | 350/96.16 |
| 5,311,604 | 5/1994 | Rogner et al. | 385/46 |

*Primary Examiner*—Georgia Y. Epps
*Assistant Examiner*—Thomas Robbins
*Attorney, Agent, or Firm*—Ernest E. Helms

[57] ABSTRACT

An optical splitter arrangement is provided for accepting a light from at least one input and providing multiple light outputs of four or more, a light intensity of the outputs differing from one another no more than two dB, and a light intensity of the cumulative outputs differing no more than three dB from the light intensity of the input. The arrangement includes at least one input fiber having a diameter (I) and a numerical aperture (NA), the input fiber providing a light input and projecting the light input into a spot sized to a diameter (D); at least two intermediate ribbon mixing elements, the ribbon mixing elements having a generally constant thickness and height cross-sectional areas with each ribbon mixing element with a cross-sectional endface exposed to the projected spot of input optical fiber, each such ribbon mixing element being exposed to a generally equal area to the spot, and a total thickness of the ribbon mixing elements being approximately equal to D, the endface of the ribbon mixing elements being spaced approximately (D–I)/(2×tan theta) wherein theta equals sine$^{-1}$ (NA); and a C number of output optical fibers abutting an end of each ribbon mixing element opposite the input optical fiber(s) wherein C is at least two.

3 Claims, 9 Drawing Sheets

OPTICAL SPLITTER

FIELD OF THE INVENTION

The field of the present invention is that of an optical beam splitter utilized in optical fiber systems to divide the optical signal from one or more inputs into several output signal components to activate various optoelectronic devices.

BACKGROUND OF THE INVENTION

There are many approaches that the industry uses to make optical splitters. One approach is a fused pair element design, where an input optical fiber(s) is chemically or sonically welded to a number of output optical fibers. The output optical fibers are usually wrapped around a central input optical fiber(s). Light from the input optical fiber(s) reaches the fused section, and ideally an equal portion of light is coupled to each of the output optical fibers. The fused pair approach is very difficult to mass produce and, as the number of output optical fibers increases, the uniformity decreases [due to the fact that those optical fibers closer to the center of the fused element (input optical fiber(s)) receive more of the light].

Figure 2:
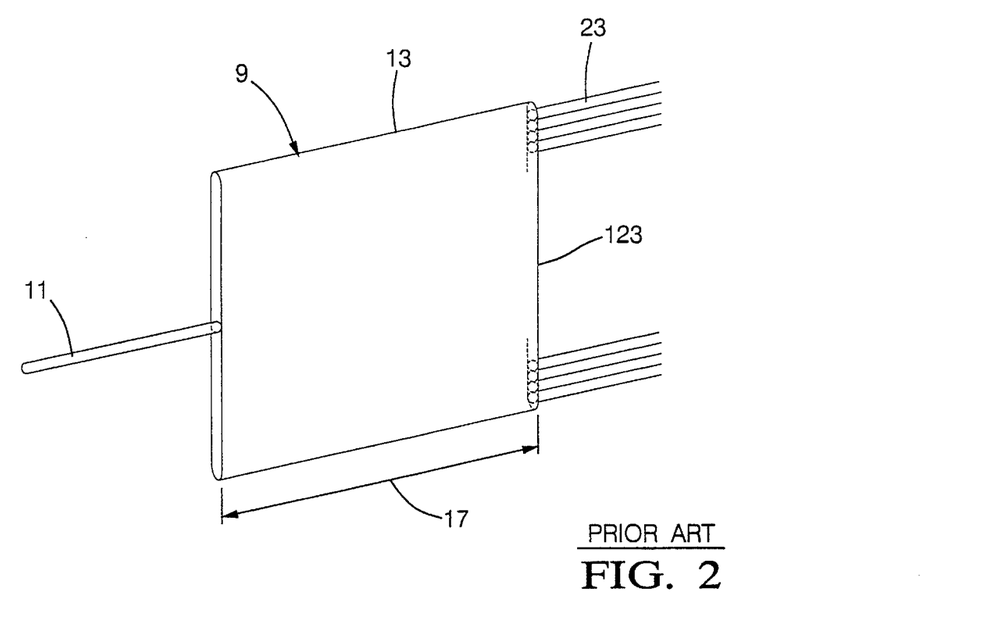
FIGS. 2 through 9 illustrate the prior art and optical principles leading to the development of the present invention.

A second optical splitter design approach is to use a separate mixing element. Light from a single input optical fiber is coupled to a larger fiber optic ribbon mixing element. By the time the light reaches an output side of the ribbon mixing element, the light is ideally spread evenly across an endface of the fiber optic ribbon mixing element so that an even amount is coupled to each of the output optical fibers. An example of the second noted approach is shown in U.S. Pat. No. 4,995,692. However, applying the second approach requires use of a 32 mm by 0.9 mm ribbon mixing element to split the optical signal into 32 output signals. An input optical fiber 11 one millimeter in diameter is placed in the middle of an input side of the ribbon mixing element 13, and the various output optical fibers 23 are aligned along an output face of the ribbon mixing element 13 (see FIG. 2). There are several problems with the second approach. In order to get the light to spread evenly across the endface 123 of the ribbon mixing element 13 (to assure good uniformity), the ribbon mixing element length 17 is increased significantly, making the package size of the ribbon mixing element 13 very large. Secondly, increasing the length of the ribbon mixing element 13 also increases the attenuation experienced inside the ribbon mixing element 13, increasing the total insertion loss of the optical splitter 9.

SUMMARY OF THE INVENTION

The present invention provides an optical splitter using at least two ribbon mixing elements. As mentioned previously, it is crucial to obtain excellent uniformity, and the key to providing good uniformity is to couple the same amount of light into each of the ribbon mixing elements.

The present inventive optical splitter minimizes the amount of light lost at the interface of the input fiber and the ribbon mixing elements. The ribbon mixing elements are constructed similarly to the optical fiber itself, i.e., they can, for example, have a core made of polymethylmethacrylate (PMMA) surrounded by a thin layer of cladding material with a different refractive index such as fluorinated polymer. By simply butting an input optical fiber against the middle of two ribbon mixing elements, a significant percentage of the optical fiber endface area will couple light into the cladding (of the ribbon mixing element) where it is lost. In order to minimize the amount of light that is lost because it is coupled into the cladding instead of the ribbon mixing elements, the input optical fiber is set back a precise distance from the endfaces of the ribbon mixing elements such that a spot size of the light coming from the end of the input optical fiber just covers the full width of the ribbon mixing elements. The percentage of the output coupling optical fiber endface area that couples against the cladding (of the ribbon mixing elements) is greatly diminished. Additionally, the present invention is less susceptible to lateral misalignment (between the input optical fiber and the ribbon mixing elements), which can lessen uniformity.

An embodiment of the present inventive optical splitter provides uniformity for one input to 32 outputs of within two decibels differential of uniformity from one output to another output and has a total loss under three decibels from light input to cumulative output light intensity.

DETAILED DESCRIPTION OF THE DRAWINGS

Figure 1:
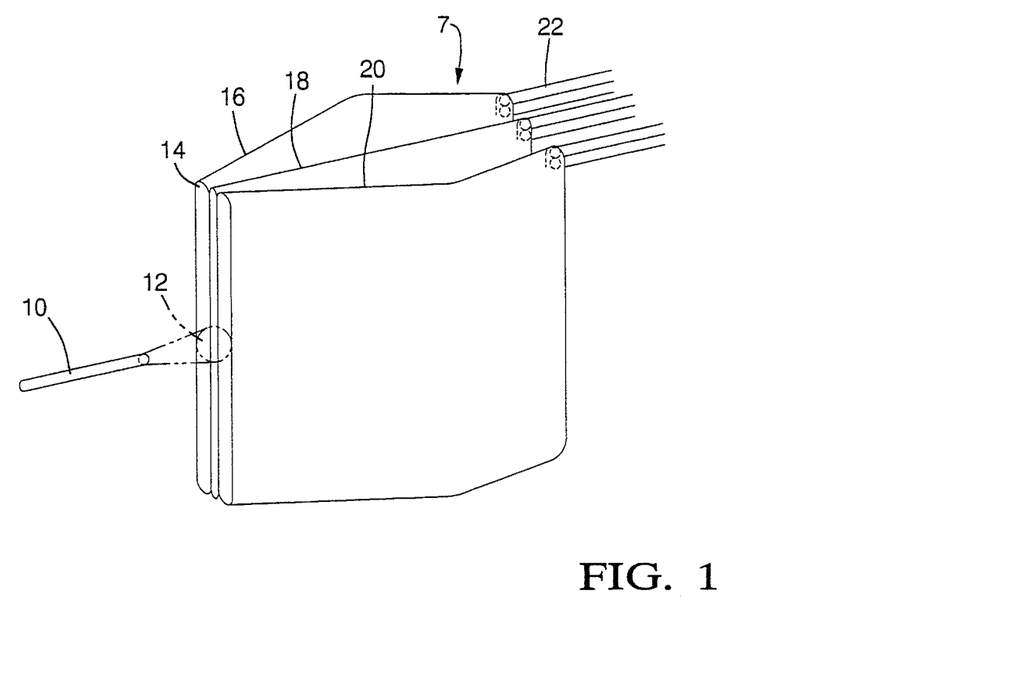
FIG. 1 is a perspective view of an alternate preferred embodiment of the present invention.

Referring to FIG. 1 in a perspective view, an input optical fiber 10 projects light into a spot 12 that impacts upon cross-sectional edges 14 of ribbon mixing elements 16, 18 and 20. Butted to a rear face of the fiber optic ribbons 16, 18 and 20 are a plurality of output optical fibers 22. The input optical fiber 10 may present an optic signal such as engine speed which then must be transmitted to various other outputs (controllers) such as transmission controllers, traction control modulators, anti-lock braking actuators, engine timing control, air/fuel ratio regulators, alternator and engine electrical systems and other various electrical components which need to be cognizant of engine speed. Each output optical fiber 22 must provide a minimum light intensity so that the output light signal may be converted to its required electrical signal. To minimize the power signal required for the input optical fiber 10, distribution of light intensity to the separate output optical fibers 22 should be as uniform as possible and should vary from one output optical fiber to another no more than two decibels. Additionally, the intensity of the light output emanating from the output optical fibers 22 in a summation should differ no three decibels than the light exciting from the input optical fiber 10. It is also important to note that the optical splitter 7 should be as small as possible in order to meet spatial restraints common in automotive vehicles.

Figure 3:
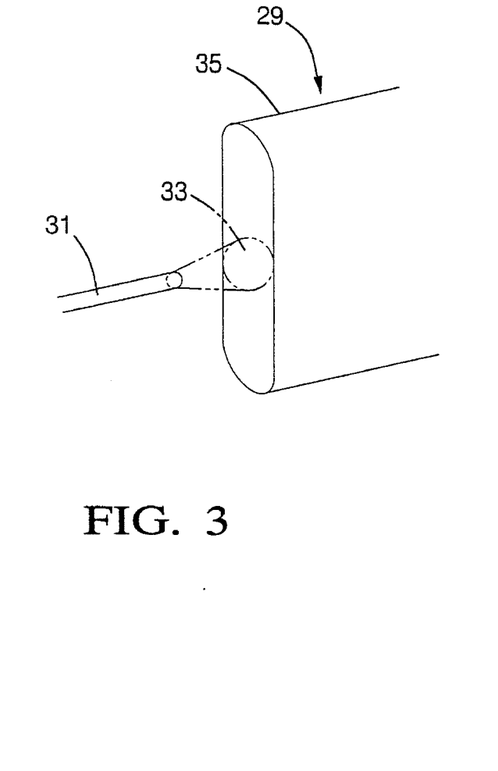
Figure 4:
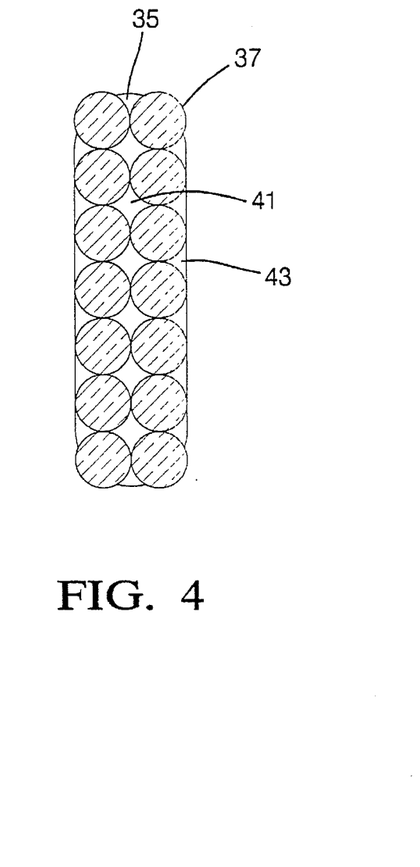
Figure 5:
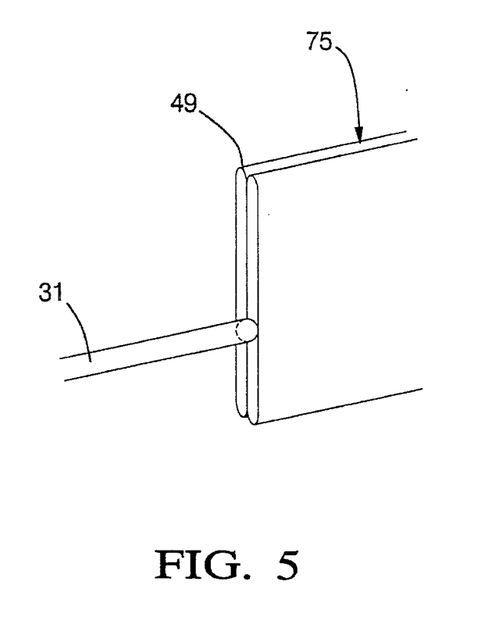
Figure 6:
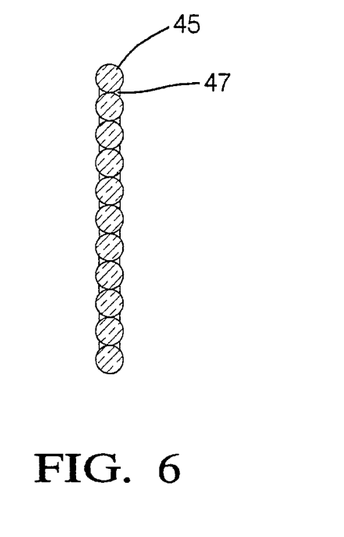

In FIG. 3, an optical splitter 29 has an input fiber optic cable 31 which projects a spot 33 on a ribbon mixing element 35. The ribbon mixing element 35 at its exit end has a plurality of butted output optical fibers 37. However, the configuration of the optical splitter 29 shown in FIGS. 3 and 4 suffers in efficiency at the output due to the areas 41 and 43 which are not coupled to the output optical fibers 37 and therefore increases overall light intensity losses. In FIGS. 5 and 6, two fiber optic ribbon mixing elements 49 are utilized for an input optical fiber 31. The width of each ribbon mixing element 49 is one-half the diameter of the input optical fiber 31. The endface of each ribbon mixing element 49 is then butted to an output optical fiber 45, leaving only areas 47 uncovered, causing minimal loss of light. The optical splitter 75 design of FIGS. 5 and 6 significantly diminishes output losses.

Figure 7:
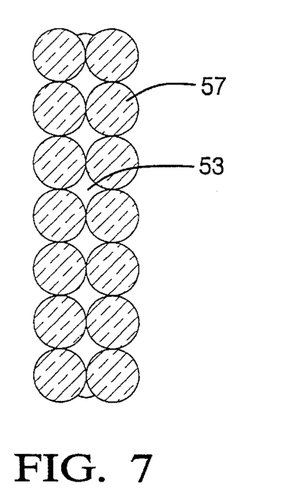
Figure 8:
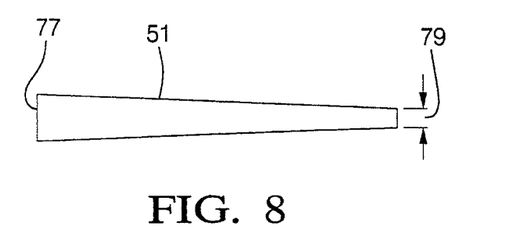
Figure 9:
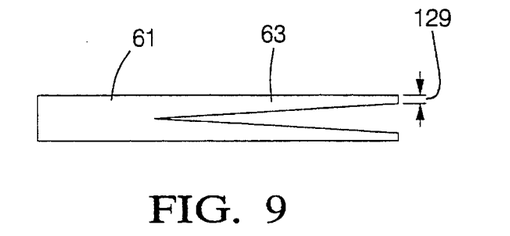

A reduction in output losses can also be obtained with a double-width ribbon mixing element. Ribbon mixing element 51 has a double width at the input end 77 but tapers down significantly at an output end 79 (see FIG. 8). A tapered ribbon mixing element is much more difficult to manufacture and, therefore, is more expensive. The ribbon mixing element 51 is still not as efficient as the dual ribbon mixing element 49 in the optical splitter 75. All the white area 53 between the output optical fibers 57 still represents lost light (see FIG. 7). A ribbon mixing element 61 could be made even more complex so that the ribbon mixing element tapers off into two single-width (output end 129 being 0.5 the width of output end 79) ribbon mixing elements 63 (see FIG. 9), but the tapered design increases cost further.

When the input optical fiber 31 is backed away from the ribbon mixing elements 81 (in FIG. 10B as Compared to FIG. 10A), input coupling efficiency is increased and better uniformity is obtained.

Figure 10A:
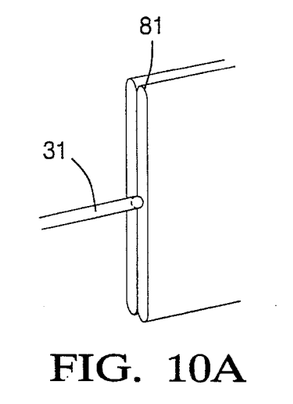
FIGS. 10A, 10B, 10C, 11 and 12 are utilized to explain the principles behind the present invention.
Figure 10B:
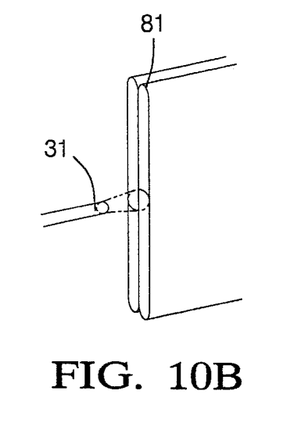

As shown in FIG. 10B, when the input optical fiber 31 is backed away the optimal distance from the ribbon mixing elements 81, the coupling efficiency is:

$$\left(1 - \frac{(2*\text{cladding thickness}*\text{spot size diameter})}{\pi*(\text{spot size diameter}/2)^2}\right)$$

The cladding thickness relates to the thickness of the cladding which surrounds the ribbon mixing elements 81.

However, when the input optical fiber 31 is mated flush to the endface of the ribbon mixing elements 81 (FIG. 10A), the coupling efficiency is:

$$\left(1 - \frac{(2*\text{cladding thickness}*\text{fiber diameter})}{\pi*(\text{fiber diameter}/2)^2}\right)$$

A comparison is given below for a number of scenarios:

| Total Mixing Element Ribbon Width | Cladding Thickness | Input Fiber Diameter | Gap Efficiency | Flush Efficiency |
| --- | --- | --- | --- | --- |
| 1.5 mm | 0.015 mm | 1.00 mm | 0.975 | 0.962 |
| 2.00 mm | 0.02 mm | 1.00 mm | 0.975 | 0.949 |
| 3.00 mm | 0.03 mm | 1.00 mm | 0.975 | 0.924 |

The above chart illustrates the lower insertion loss realized by having a gap between the input optical fiber 31 and the ribbon mixing elements 81. Having a gap also reduces the impact of tolerance effects. Tolerance on the lateral position of the input optical fiber 31 with respect to the ribbon mixing elements 81 will cause both an increase in insertion loss and a decrease in uniformity. One slight advantage for the flush connection configuration of FIG. 10A over the gap technique is that a lateral shift of the input optical fiber 31 does not increase the overall insertion loss of the optical splitter. All of the light from the input optical fiber is coupled into at least one of the ribbon mixing elements.

Figure 10C:
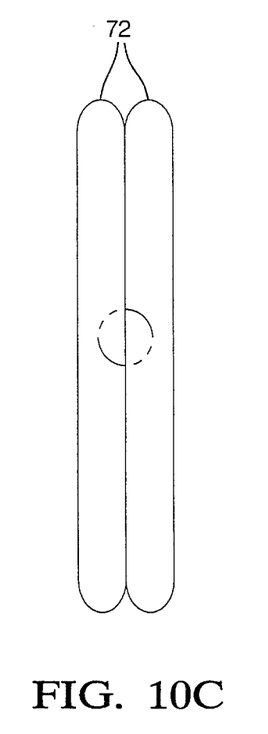
Figure 11:
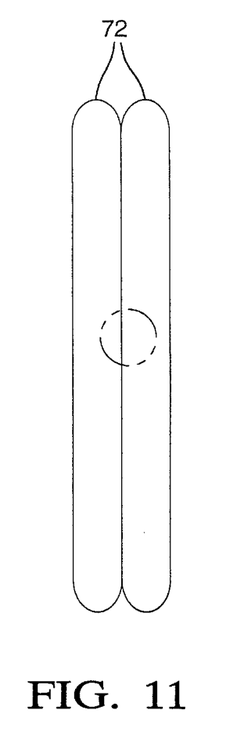

However, with the flush connection, lateral tolerance (compare FIGS. 10C and 11) has a much larger effect on uniformity which greatly offsets the slight advantage of the flush connection design. Below is listed for a number of scenarios of a decrease in uniformity for the gap technique and flush technique.

| Total Mixing Element Ribbon Width | Input Fiber Diameter | Lateral Tolerance | Uniformity Decrease | |
| --- | --- | --- | --- | --- |
| | | | Gap | Flush |
| 2.00 mm | 1.00 mm | 0.05 mm | 0.96 dB | 2.25 dB |
| 2.00 mm | 1.00 mm | 0.10 mm | 1.87 dB | 4.71 dB |
| 2.00 mm | 1.00 mm | 0.15 mm | 2.80 dB | 7.80 dB |

The impact of lateral tolerance on light intensity uniformity dominates. When designing an optical network, an output source with the lowest light intensity must emit enough light so that a light signal can traverse the highest attenuation path in the optic network. Light signal intensity must be sufficient so that the lowest sensitivity optical receiver can correctly convert the light signal back to electrical pulses. With a splitter, uniformity determines what that worst case attenuation will be. Uniformity is defined as being the difference between the highest light intensity seen at an output of the splitter and the lowest light intensity seen for any other output. Since the worse case path is determined using the lowest output from the splitter, poor uniformity (i.e., the differential in light intensity of various outputs is higher) increases the attenuation of the worse case path, requiring either higher light intensity input sources or more sensitive detectors (connected to the output), increasing the total system cost.

Figure 12:
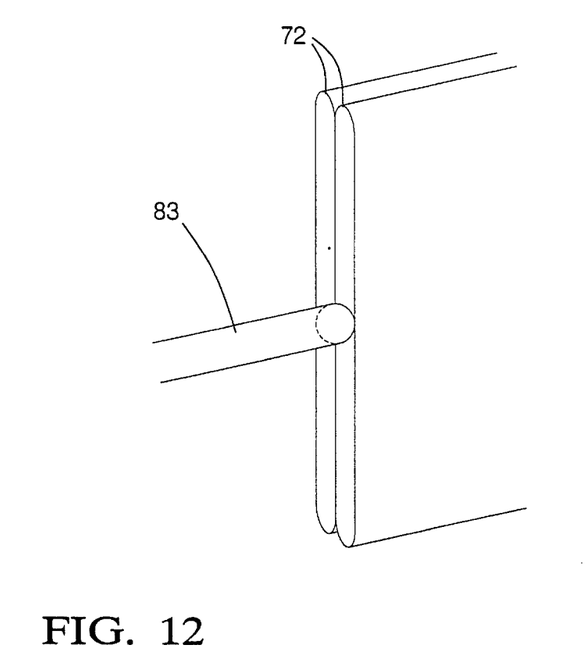
Figure 13:
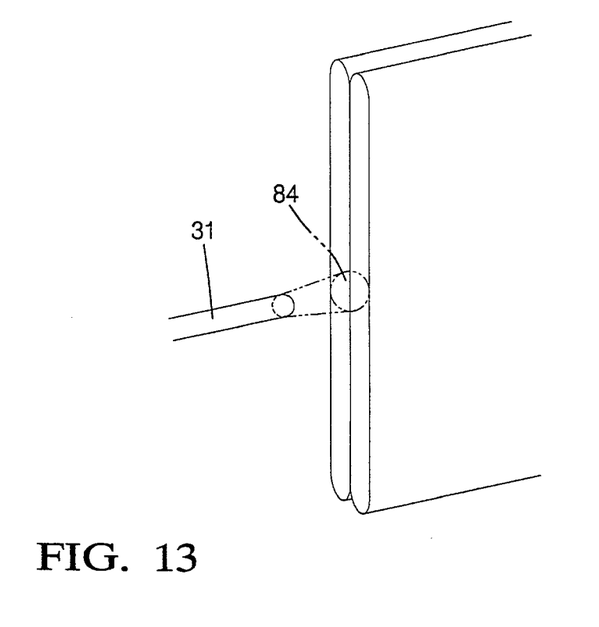
FIG. 13 is a perspective view of a preferred embodiment of the present invention.

As long as the input optical fiber diameter is no larger than the thickness of the ribbon mixing elements, all of the light from the input optical fiber is coupled into the ribbon mixing elements. Ideally, the spot size of the light incident on the endface of the ribbon mixing elements has a diameter equal to the combined width of the ribbon mixing elements. The above-noted arrangement minimizes tolerance effects. When the diameter of an input optical fiber 83 (FIG. 12) is equal to the collective width of the ribbon mixing elements 72, the optical fiber 83 abuts directly against the ribbon mixing elements 72. When the diameter of the input optical fiber 31 is smaller than the width of the ribbon mixing elements 72, the input optical fiber 31 is backed a sufficient distance so that the size of a spot 84 incident on the endface of the ribbon mixing elements 72 is equal to the width of the ribbon mixing elements 72. The proper gap is determined by the output numerical aperture of the input optical fiber 31, using an equation to be described later.

If an input optical fiber is larger than the total width of the ribbon mixing elements, then a portion of the light from the input optical fiber will be lost unless the light can be focused down to a smaller spot size. Therefore, use of a larger input optical fiber (in relationship to the ribbon mixing element total width) requires lensing which is hard to manufacture. Lensing is also expensive. In a typical fiber optic system, the input optical fiber size is fixed, and the only variable is the width of the ribbon mixing elements. Therefore, the present invention is advantageous in that it can use smaller width ribbon mixing elements while still capturing all the light from an input optical fiber, thereby coupling more of the light from the mixing ribbon to the output optical fibers.

Figure 14:
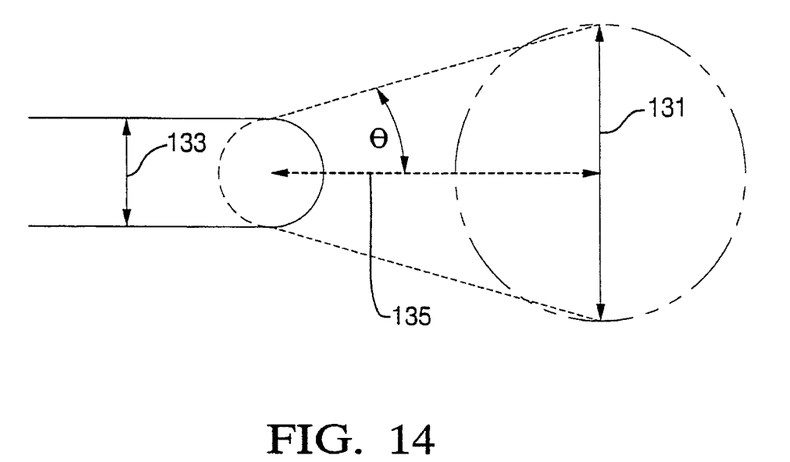
FIGS. 14 through 22 are schematic drawings illustrating various optical principles concerning the present invention.
Figure 15:
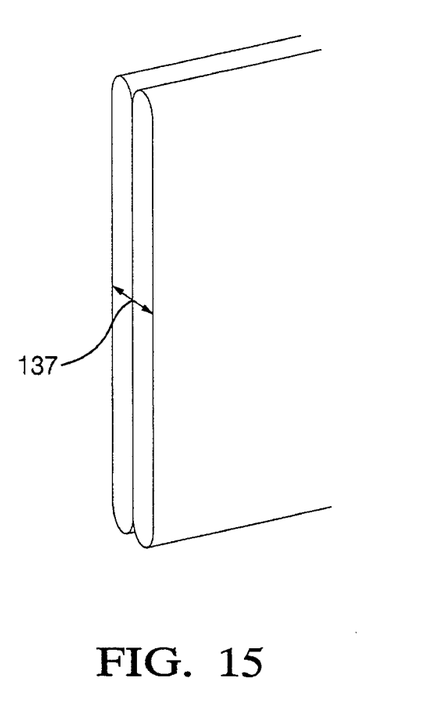

Referring to FIGS. 14 and 15, the numerical aperture (NA) of the input optical fiber=sine(θ). The spot size 131= input optical fiber diameter 133+2*tan(θ)*gap. Optimally, the spot size should exactly equal the total width 137 of the ribbon mixing elements when placed side by side. So, the optimal gap is determined by:

gap =

$$\frac{(\text{ribbon mixing element width} - \text{input optical fiber diameter})}{2*\tan(\theta)}$$

where θ is given by θ=sine$^{-1}$ (NA).

Figure 16:
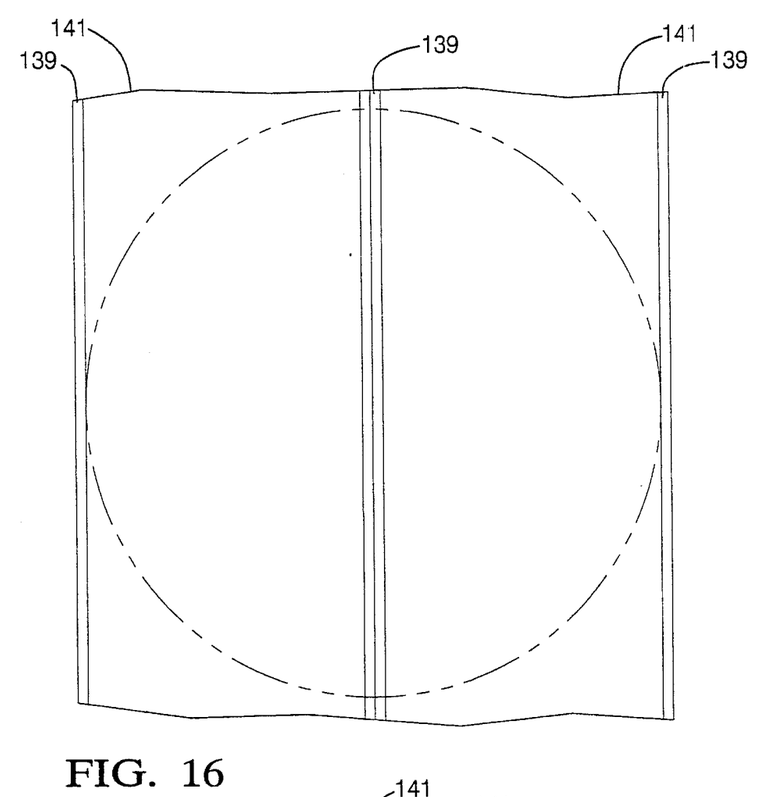
Figure 17:
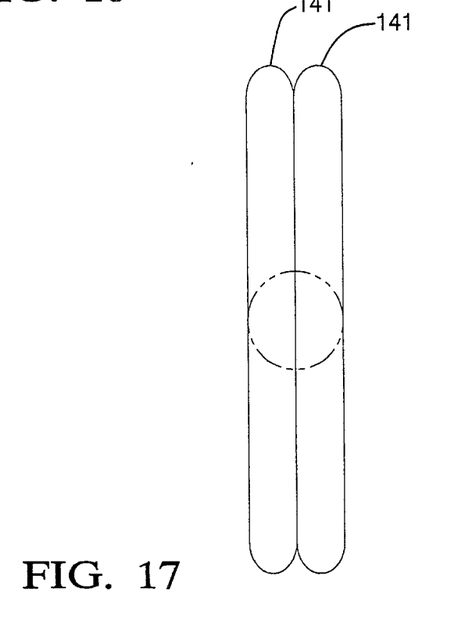

The percent of light coupled into cladding 139 with the input optical fiber backed away from ribbon mixing elements 141 (for two ribbon mixing element embodiments, see FIGS. 16 and 17):

$$\frac{(2*\text{mixing element cladding thickness}*\text{spot size diameter})}{\pi*(\text{spot size diamter}/2)^2}$$

For 0.02 mm cladding thickness and 1.82 mm spot size, 2.7% of the light is lost into the cladding, providing 97.3% coupling efficiency at the input.

Figure 18:
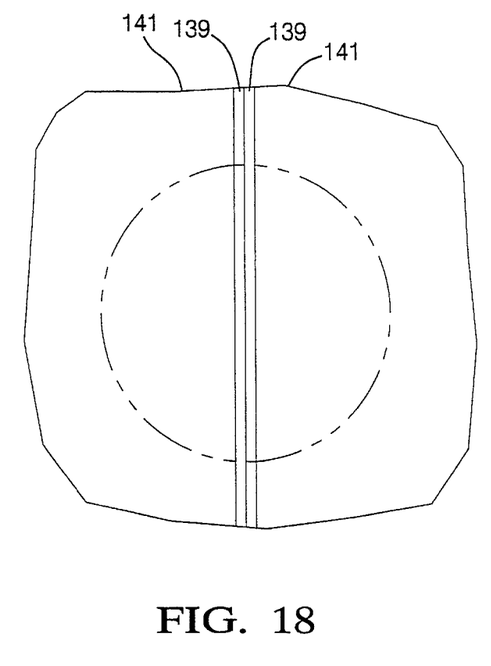
Figure 19:
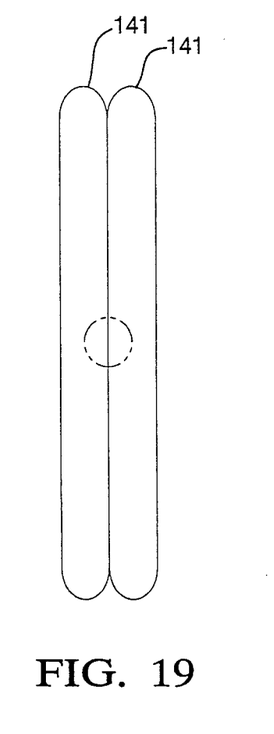

The percent of light coupled into cladding with a butt input cable fiber connection to ribbon mixing elements 141 (FIGS. 18 and 19):

$$\frac{(2*\text{mixing element cladding thickness}*\text{fiber diameter})}{\pi*(\text{fiber diamter}/2)^2}$$

For 0.02 mm cladding thickness and 1 mm input optical fiber diameter, 5.1% of the light is lost into the ribbon mixing element cladding, providing 94.9% coupling efficiency at the input.

Figure 23:
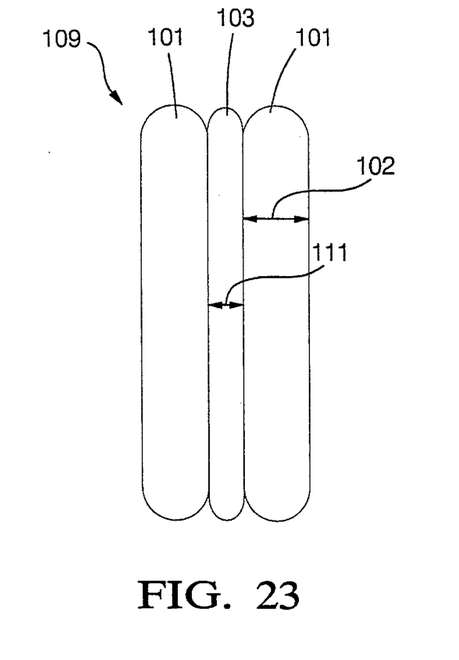
FIGS. 23 and 24 are front elevational views of the ribbon mixing elements utilized in alternate preferred embodiments of the present invention.
Figure 24:
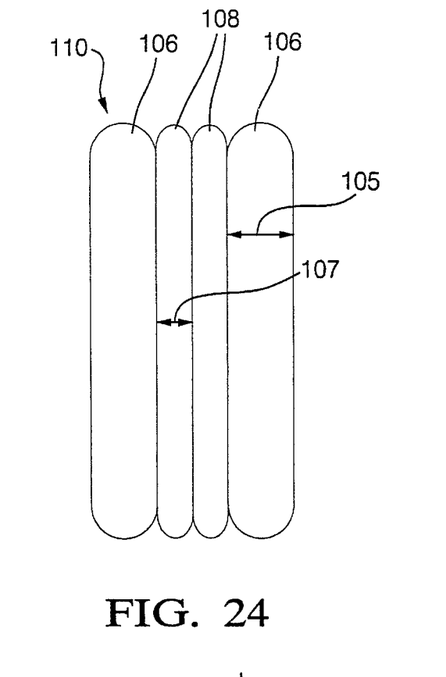

The present inventive optical splitter is not limited to two ribbon mixing elements, but as shown in FIGS. 23 and 24 may have three or four ribbon mixing elements, as shown in optical splitters 109 and 110. In the optical splitter 109, the middle ribbon mixing element 103 has a width 111 which is approximately 0.72 the thickness 102 of the outer ribbon mixing elements 101. In the optical splitter 110, the width 107 of the intermediate ribbon mixing element is approximately 0.678 the width 105 of the outer mixing elements 106. In both optical splitters 109 and 110, the ribbon mixing elements are sized to provide an equal amount of light input into each ribbon element.

Figure 20:
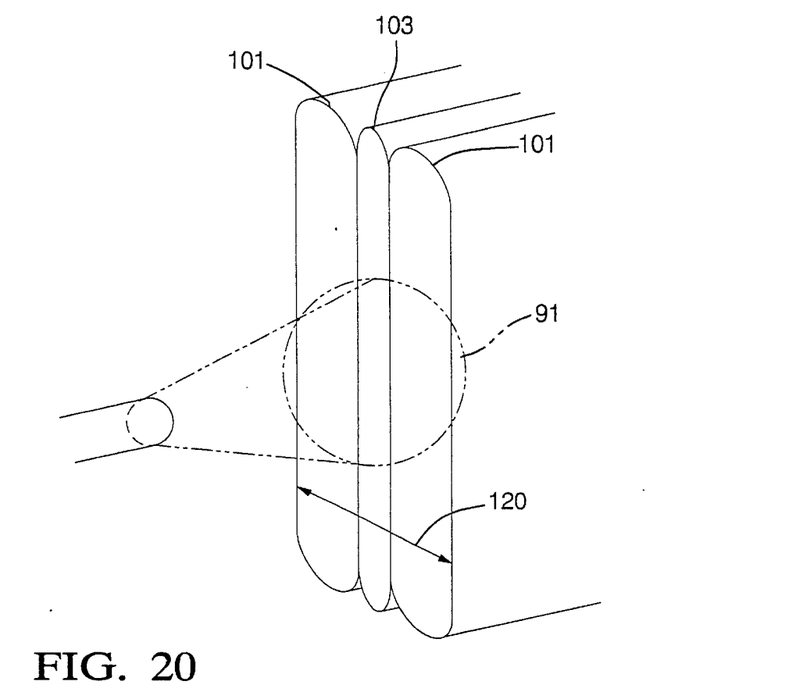
Figure 21:
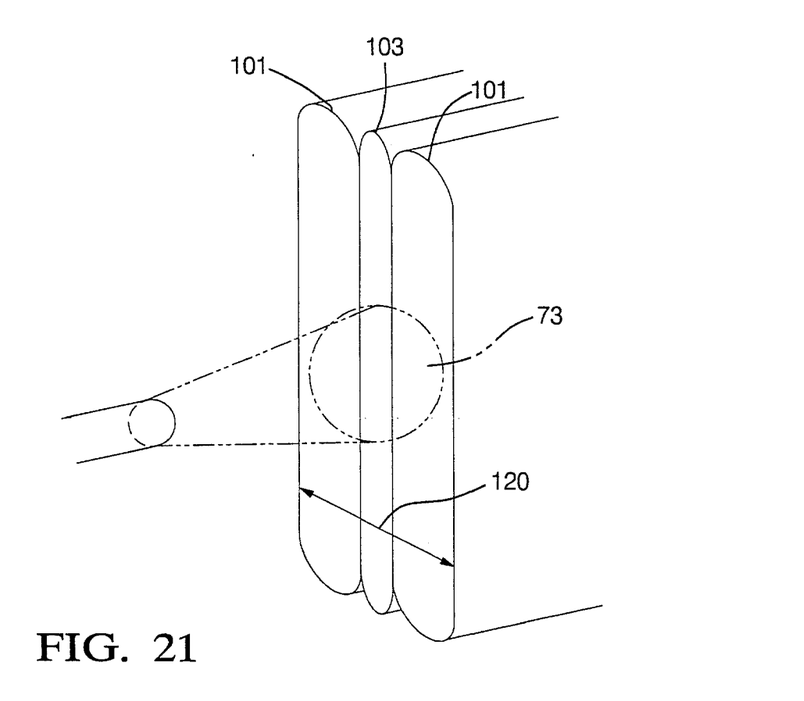

As previously mentioned, one important tolerance is the lateral tolerance between input optical fiber and ribbon mixing elements. A second significant tolerance is on the gap between input optical fiber and the ribbon mixing elements. Variation in the position of the input optical fiber relative to the endface of the ribbon mixing elements will change the diameter of the spot size of light incident on the ribbon mixing elements. With a tolerance of 0, the spot size should ideally be exactly equal to the total width 120 of the ribbon mixing elements. An increase in the gap (FIG. 20) will cause the spot size 91 to be larger than the width 120 of the ribbon mixing elements 101, 103, thereby losing some light and increasing the insertion loss of the optical splitter. If the gap is too small (FIG. 21), a smaller spot size 73 will be the result, causing less light to be coupled into the outer ribbon mixing elements 101 and more light to be coupled into the center ribbon mixing element 103, reducing Uniformity. If the gap is larger than nominal, the increase in insertion loss incurred is as follows:

| A<br>Input<br>Cable<br>Diameter | B<br>Ribbon Mixing<br>Element Total<br>Width | Tolerance Gap/<br>Nominal Gap | Loss<br>Incurred |
|---|---|---|---|
| 1.00 mm | 1.00 mm | 0.05 mm/0.000 mm* | 0.123 dB |
| 1.00 mm | 1.50 mm | 0.05 mm/0.0433 mm | 0.069 dB |
| 1.00 mm | 2.00 mm | 0.05 mm/0.866 mm | 0.045 dB |
| 1.00 mm | 1.00 mm | 0.10 mm/0.000 mm* | 0.324 dB |
| 1.00 mm | 1.50 mm | 0.10 mm/0.0433 mm | 0.185 dB |
| 1.00 mm | 2.00 mm | 0.10 mm/0.866 mm | 0.123 dB |
| 1.00 mm | 1.00 mm | 0.20 mm/0.000 mm* | 0.808 dB |
| 1.00 mm | 1.50 mm | 0.20 mm/0.0433 mm | 0.477 dB |
| 1.00 mm | 2.00 mm | 0.20 mm/0.866 mm | 0.324 dB |

*Given for example only

If the gap is smaller than nominal, as discussed previously, there is a decrease in uniformity, but this is true only if there are more than two ribbon mixing elements. If there are two ribbon mixing elements, each mixing element still receives an equal portion of light (assuming no lateral tolerance). The only effect in that case is a negligible increase in insertion loss since fractionally more light is coupled into the ribbon mixing element cladding and lost. The decrease in uniformity is as follows for the three mixing element case:

| Ribbon<br>Mixing<br>Elements | Gap<br>Tolerance | Input Cable<br>Diameter | Ribbon Mixing<br>Element Total<br>Width | Loss<br>Incurred |
|---|---|---|---|---|
| 3 | 0.05 mm | 1.00 mm | 2.72 mm | 0.12 dB |
| 3 | 0.10 mm | 1.00 mm | 2.72 mm | 0.26 dB |
| 3 | 0.20 mm | 1.00 mm | 2.72 mm | 0.54 dB |
| 3 | 0.05 mm | 1.00 mm | 1.36 mm | 0.26 dB |
| 3 | 0.10 mm | 1.00 mm | 1.36 mm | 0.54 dB |
| 3 | 0.20 mm | 1.00 mm | 1.36 mm | 1.16 dB |

Figure 22:
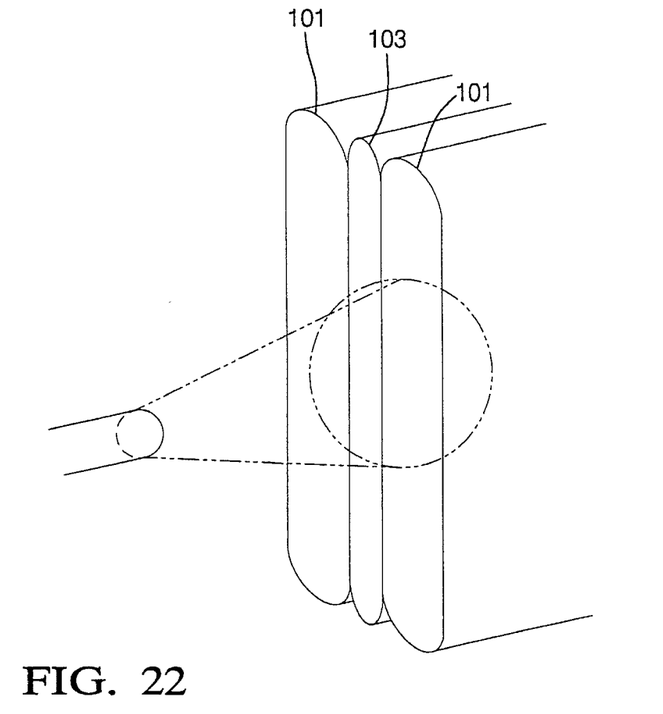

Lateral tolerance causes the circle of light incident upon the endfaces of the ribbon mixing elements to be shifted with regard to the ribbon mixing elements, so that it is no longer centered. Lateral tolerance produces two results: an increase in insertion loss since a portion of the light is no longer coupled to the ribbon mixing elements 101, 103, 101 (FIG. 22), and a decrease in uniformity since less light is coupled into the ribbon mixing element that is shifted away from while more light is coupled into the rib bon mixing element(s) laterally shifted to.

The worst case scenario is when s connector for the input optical fiber is maximally out of tolerance in one direction while the ribbon mixing elements are maximally out of tolerance in the other direction. For this worst case scenario, the increase in insertion loss is as follows:

| Mixing<br>Elements | Total Ribbon Width | Lateral<br>Tolerance | Increased Loss |
|---|---|---|---|
| 3 | 2.72 mm | 0.05 mm | 0.052 dB |
| 3 | 2.72 mm | 0.10 mm | 0.146 dB |
| 3 | 2.72 mm | 0.15 mm | 0.269 dB |
| 3 | 2.72 mm | 0.30 mm | 0.777 dB |

The decrease in uniformity is the more severe effect. For the two ribbon scenario, the decrease in uniformity is as follows:

| Total Ribbon Width | Tolerance | Decrease in Uniformity |
|---|---|---|
| 2.00 mm | 0.05 mm | 0.96 dB |
| 2.00 mm | 0.10 mm | 1.87 dB |
| 2.00 mm | 0.15 mm | 2.80 dB |

For the three ribbon scenario, the decrease in uniformity is as follows:

| Total Ribbon Width | Tolerance | Decrease in Uniformity |
|---|---|---|
| 2.00 mm | 0.05 mm | 0.92 dB |
| 2.00 mm | 0.10 mm | 1.86 dB |
| 2.00 mm | 0.15 mm | 2.83 dB |

Note that the effect is relatively independent of the number of ribbons. This is because the change in amount of light coupled is most pronounced in the outer two ribbons.

In all cases of the present invention, it is desirable to keep the diameter of the output optical fibers as large as possible in comparison to the thickness of the ribbon mixing elements.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An optical splitter arrangement for accepting a light from at least one input and providing multiple light outputs of four or more, a light intensity of the outputs differing from one another no more than two dB, and a light intensity of the cumulative outputs differing no more than three dB from the light intensity of the input, the arrangement comprising:

at least one input optical fiber having a diameter (I) and a numerical aperture (NA), the input optical fiber providing a light input and projecting the light input into a spot sized to a diameter (D);

at least two intermediate ribbon mixing elements, the ribbon mixing elements having a generally constant thickness and height cross-sectional areas with each ribbon mixing element with a cross-sectional endface exposed to the projected spot of input optical fiber, each such ribbon mixing element being exposed to a generally equal area to the spot, and a total thickness of the ribbon mixing elements being approximately equal to D, the endface of the ribbon mixing elements being spaced approximately $(D-I)/(2 \times \tan \theta)$ wherein theta equals $\sin^{-1}$ (NA); and a C number of output optical fibers abutting an end of each ribbon mixing element opposite the input optical fiber(s) wherein C is at least two.

2. An optical splitter arrangement as described in claim 1 wherein there are three ribbon mixing elements and the middle ribbon mixing element is approximately 0.720 the width of the outer ribbon mixing elements.

3. An optical splitter arrangement as described in claim 1 wherein there are four ribbon mixing elements, and two middle ribbon mixing elements have a diameter of approximately 0.678 the diameter of the outer ribbon mixing elements.

\* \* \* \* \*